(12) United States Patent
Wang et al.

(10) Patent No.: US 7,805,080 B2
(45) Date of Patent: Sep. 28, 2010

(54) OPTICAL INTERCONNECT

(75) Inventors: Shih-Yuan Wang, Palo Alto, CA (US);
Mihail Sigalas, Santa Clara, CA (US);
Wei Wu, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 614 days.

(21) Appl. No.: 11/821,532

(22) Filed: Jun. 22, 2007

(65) Prior Publication Data
US 2008/0317474 A1    Dec. 25, 2008

(51) Int. Cl.
*H04B 10/00* (2006.01)
(52) U.S. Cl. .................. 398/129; 398/122; 398/131; 398/164
(58) Field of Classification Search .......... 398/164, 398/131, 122, 123, 129
See application file for complete search history.

(56) References Cited

U.S. PATENT DOCUMENTS

| | | | |
|---|---|---|---|
| 4,543,662 A * | 9/1985 | Huignard et al. ........... 398/55 |
| 6,058,227 A * | 5/2000 | Wong ....................... 385/16 |
| 6,445,514 B1 | 9/2002 | Ohnstein et al. |
| 6,636,653 B2 | 10/2003 | Miracky et al. |
| 6,775,480 B1 * | 8/2004 | Goodwill .................. 398/158 |
| 6,778,741 B2 | 8/2004 | Lefebvre |
| 6,814,498 B2 | 11/2004 | Kang et al. |
| 6,844,214 B1 | 1/2005 | Mei et al. |
| 6,934,438 B2 * | 8/2005 | Hoke ....................... 385/16 |
| 6,970,649 B2 | 11/2005 | DeCusatis et al. |
| 7,014,742 B2 | 3/2006 | Birkbeck et al. |
| 7,027,478 B2 | 4/2006 | Ackley |
| 7,039,265 B2 * | 5/2006 | Levy et al. ................. 385/14 |
| 7,050,669 B2 | 5/2006 | Barrett et al. |
| 7,155,129 B2 | 12/2006 | Bringans et al. |
| 2002/0027300 A1 | 3/2002 | Hartmann et al. |
| 2002/0105699 A1 | 8/2002 | Miracky et al. |
| 2003/0010636 A1 | 1/2003 | Birkbeck et al. |
| 2003/0057363 A1 | 3/2003 | Anderson et al. |
| 2003/0081281 A1 | 5/2003 | DeCusatis et al. |
| 2003/0095582 A1 | 5/2003 | Ackley |
| 2003/0095803 A1 * | 5/2003 | Iino et al. .................. 398/55 |
| 2003/0103735 A1 | 6/2003 | Anderson et al. |
| 2004/0114935 A1 * | 6/2004 | Fushimi et al. ............ 398/141 |
| 2004/0208596 A1 | 10/2004 | Bringans et al. |
| 2007/0029277 A1 | 2/2007 | Jacobowitz et al. |
| 2007/0030570 A1 | 2/2007 | Jacobowitz et al. |

FOREIGN PATENT DOCUMENTS

| | | |
|---|---|---|
| JP | 2005249919 | 9/2005 |
| WO | WO 01/62400 A2 | 8/2001 |
| WO | WO 02/31569 A2 | 4/2002 |
| WO | WO 02/50584 A2 | 6/2002 |
| WO | WO 02/075276 A3 | 9/2002 |
| WO | WO 03/001246 A2 | 1/2003 |
| WO | WO 2007/019008 A2 | 2/2007 |

* cited by examiner

*Primary Examiner*—M. R. Sedighian

(57) ABSTRACT

An optical interconnect has a plurality of optical data sources, a plurality of optical data receivers, a diffractive optical element configured to diffract an optical beam from at least one alignment optical source to at least one sensor, and an aligning element configured to align optical beams from the optical data sources to said optical data receivers, according to readings from the sensor.

20 Claims, 6 Drawing Sheets

OPTICAL INTERCONNECT

BACKGROUND

Light beams or optical signals are frequently used to transmit digital data between electronic devices, both over long distances and between adjacent circuit boards. A light beam may be modulated as needed to carry data. An optical signal may also be used for other purposes including position or motion sensing, measurement, etc.

Consequently, optical technology plays a significant role in modern electronics, and many electronic devices employ optical components. Examples of such optical components include optical or light sources such as light emitting diodes and lasers, waveguides, fiber optics, lenses and other optics, photo-detectors and other optical sensors, optically-sensitive semiconductors, and others.

Systems making use of optical components often rely upon the precise manipulation of optical energy, such as a beam of light, to accomplish a desired task. This is especially true in systems utilizing light for high-speed, low-energy communication between circuit boards. The manipulation of an optical signal may include selectively encoding information in a light beam of the optical signal and directing the light beam of the optical signal to a sensor that detects the encoded light beam.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
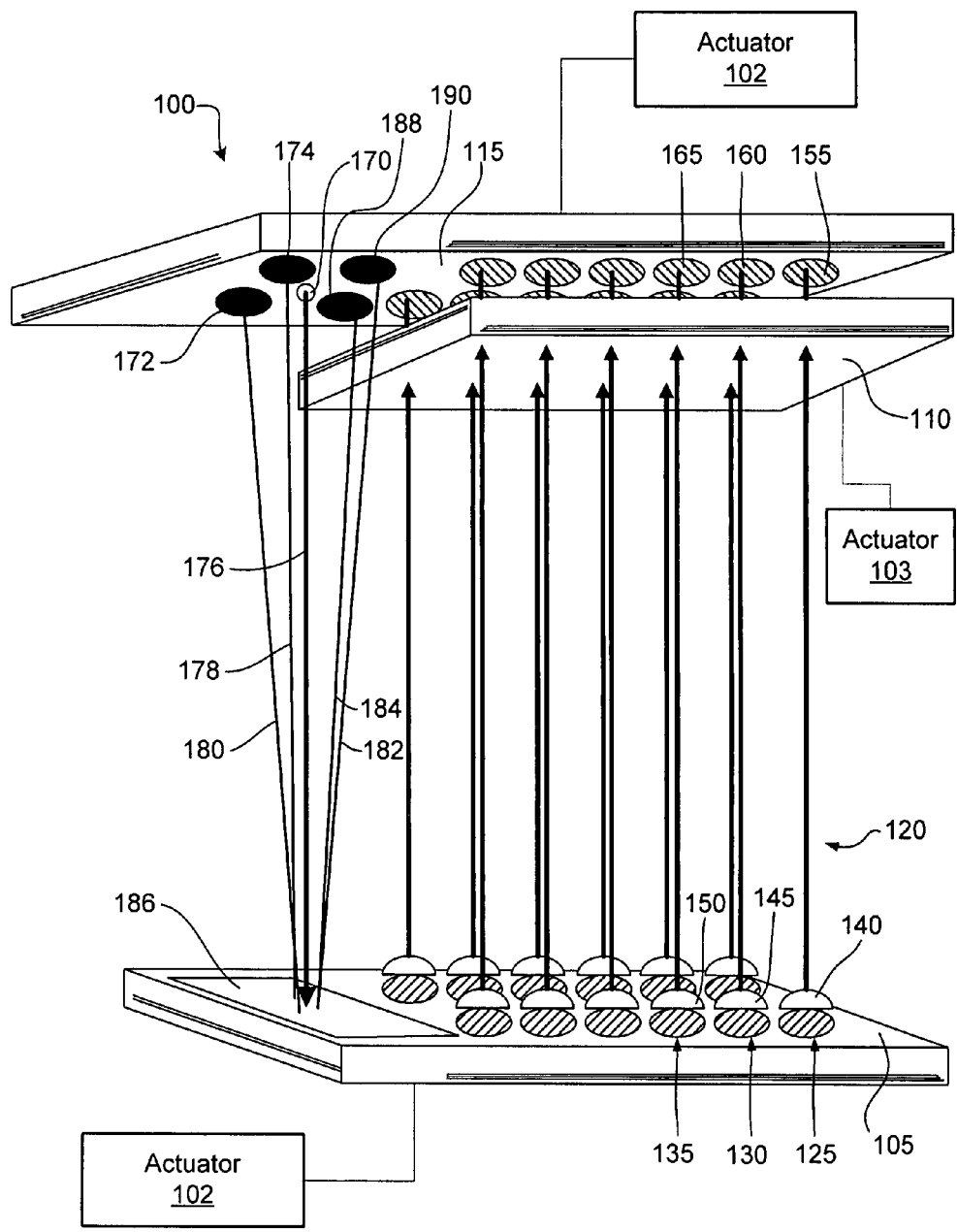
FIG. 1 is an illustration of an exemplary optical interconnect, according to principles described herein.

As noted above, light or optical beams can be used for a variety of purposes, including the transmission of data. In some such systems, the optical beam encoded with a data signal is directed or redirected into an optical path where it can be detected or received by a designated component and the data decoded. However, when optical beams are used to communicate data between physically separate electronic components, such as on separate circuit boards, correct alignment between the components may be critical. Additionally, it may be desirable to communicate optically over multiple channels to increase bandwidth and/or reliability, without occupying a large space on a circuit board. Furthermore, it may also be desirable to minimize optical impedance, interference, and/or distortion in such systems.

A prior optical solution to providing data transmission between circuit board components includes using plastic waveguides to direct a data encoded light beam to the edge of a circuit board, couple the beam into optical waveguides in a backplane of a circuit board rack, and then transmit the encoded light beam bearing the data into another waveguide on another circuit board where the beam is detected and decoded. In addition to waveguide fabrication costs and problems associated with optical losses at waveguide junctions, this solution, in general, has a longer physical data path than direct, free space optical data transmission between components.

While free space optical data transmission solutions offer significant advantages over waveguide and electrical conductor solutions, free space transmission is often accompanied by the aforementioned component alignment constraints. Moreover, optical components may occupy a significant amount of circuit board area when multiple optical channels are implemented. Hence, it may be desirable to provide a free space optical interconnect system for inter-component data transmission between circuit boards that is resistant to misalignment problems and enables multi-channel communication while occupying minimal amounts of board space.

To accomplish these and other goals, the present specification discloses apparatus, systems, and methods relating to an optical interconnect having a plurality of optical data sources, a plurality of corresponding optical data receivers, a diffractive optical element configured to diffract an optical beam from an alignment optical source to at least one sensor, and an aligning element configured to align optical beams from the optical data sources to the optical data receivers according to readings from the sensor.

As used in the present specification and in the appended claims, the term "optical energy" refers to radiated energy having a wavelength generally between 10 nanometers and 500 microns. Optical energy as thus defined includes, but is not limited to, ultraviolet, visible, and infrared light. A beam of optical energy may also be referred to herein as a "light beam" or "optical beam."

As used in the present specification and in the appended claims, the term "optical source" refers to a device from which optical energy originates. Examples of optical sources as thus defined include, but are not limited to, light emitting diodes, lasers, light bulbs, and lamps. Furthermore, an "optical data source" indicates an optical source that emits optical energy encoded with data.

As used in the present specification and in the appended claims, the term "optical interconnect" refers broadly to a component that links portions of an optical pathway along which a light beam is propagating. The optical interconnect may guide or redirect the light beam so that the beam is incident on or reaches an optical component configured to receive the light beam. Consequently, with appropriate optical interconnects, an optical pathway can be configured with any length or shape as suits a particular application.

As used in the present specification and in the appended claims, the term "actuator" refers to an apparatus that impels an object to mechanical action or motion. Examples of actuators as thus defined include, but are not limited to, electric motors, piezoelectric devices, hydraulic arms, and springs.

As used in the present specification and in the appended claims, the term "diffractive optical element" refers to a passive optical element configured to redirect chosen wavelengths of optical energy in a predetermined set of directions. The predetermined set of directions in which the optical energy is redirected may vary according to the angle of incidence at which the optical energy strikes the surface of the diffractive optical element, or according to the relative position on the surface of the diffractive optical element at which the optical energy strikes.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to exemplary optical interconnects, exemplary interboard communication systems, and exemplary methods of optical communication.

Exemplary Optical Interconnects

Referring now to FIG. 1, an exemplary optical interconnect (100) is shown. The exemplary optical interconnect (100) includes an optical source array (105) and an optical receiver array (115). The optical source array (105) includes a plurality of optical data sources (125, 130, 135) configured to emit beams (120) of optical energy. The optical data sources (125, 130, 135) may include, but are not limited to, vertical cavity surface emitting lasers (VCSELs), diode lasers, other semiconductor lasers, light emitting diodes (LEDs), combinations thereof, and the like.

The optical energy beams (120) emitted from the data sources (125, 130, 135) are encoded with data. Those familiar with the art will recognize that the data may be modulated onto the optical energy beams using any of many optical modulation schemes, including both well-known and custom or proprietary optical modulation schemes. In some embodiments, a plurality of different data channels are received in the optical source array (105) from a circuit board, and data from each of the data channels is transmitted by a corresponding optical data source.

By using multiple optical data sources (125, 130, 135) to transmit multiple data channels, the overall bandwidth of possible data transmission from the optical source array (105) may be maximized. In other embodiments, redundancy may be provided by having the same data from a single data channel transmitted in parallel by two or more of the optical data sources (e.g., 125, 130, 135). Thus, the optical data sources (e.g., 125, 130, 135) may redundantly transmit data from each of a smaller number of data channels, which may in turn increase accuracy in data transmission from the optical source array (105).

Each of the optical data sources (125, 130, 135) is configured to emit an optical energy beam in the general direction of the optical receiver array (115). In the present example, each of the optical data sources (125, 130, 135) includes an individual lens (140, 145, 150, respectively) configured to focus the beams (120) toward corresponding optical data receivers (155, 160, 165) in the optical receiver array (115). A translatable lens (110) is disposed between the optical source array (105) and the optical receiver array (115). The translatable lens (110) is configured to align the optical beams (120) from the optical data sources (125, 130, 135) with the corresponding optical receivers (155, 160, 165) in the optical receiver array (115).

The optical data receivers (155, 160, 165) are configured to receive the modulated optical beams (120) emitted from the optical data sources (125, 130, 135) and demodulate the information encoded on the optical beams (120).

The optical data receivers (155, 160, 165) may be configured to output an electric signal representative of one or more aspects of the optical beams (120). For example, the optical data receivers (155, 160, 165) may produce data signals bearing data that have been encoded or modulated in the received light beams. In this way, data transmitted from components in communication with the optical source array (105) may be received and utilized by components in communication with the optical receiver array (115).

In some embodiments, the optical receivers (155, 160, 165) include one or more photodiodes. In other embodiments, the optical receivers (155, 160, 165) may include, but are not limited to one or more waveguides, fiber optic material, optical cable, optical sensors, lenses, semiconductors, and combinations thereof.

The optical receiver array (115) of the present example further includes an alignment optical source (170) configured to emit an optical beam (176) toward a diffractive optical element (186) on the optical source array (105). In the present example, the optical beam (176) from the alignment optical source (170) is diffracted by the diffractive optical element (186) into four separate optical beams (178, 180, 182, 184) that are reflected back to corresponding optical alignment receivers (172, 174, 188, 190).

According to the alignment of the optical source array (105) and the optical receiver array (115), the diffracted optical beams (178, 180, 182, 184) are reflected back to the optical receiver array (115) at varying angles. By measuring the intensity of optical energy at the optical alignment receivers (172, 174, 188, 190) the approximate degree of alignment between the optical source array (105) and the optical receiver array (115) may be determined.

Optical measurements from the optical alignment receivers (172, 174, 188, 190) may then be used in a feedback loop with an actuator (102) configured to move the optical receiver array (115) such that the optical beams (120) from the optical data sources (125, 130, 135) are optimally aligned with their corresponding data receivers (155, 160, 165). In other embodiments, an actuator (102) may be used to similarly translate the optical source array (105). In these embodiments, additional errors due to the alignment procedure are not anticipated, provided that the translatable lens (110) remains relatively fixed with respect to the optical receiver array (115). In still other embodiments, an actuator (103) may be used with the translatable lens (110) such that the translatable lens (110) becomes positioned in a location relative to the optical receiver array (115) that causes optimal alignment of the optical beams (120) from the optical data sources (125, 130, 135) with their corresponding optical data receivers (155, 160, 165).

The components that interpret the output of the alignment receivers (172, 174, 188, 190) and reposition any of the various components, i.e., the optical source array (105), optical receiver array (115) or translatable lens (110), may be referred to collectively as an alignment element. Thus, the alignment element provides for suitable alignment between the optical source array (105) and optical receiver array (115) for the transmission of data-bearing optical beams between the two arrays.

In the present example, the alignment optical source (170) and the optical alignment receivers (172, 174, 188, 190) are integrated into the optical receiver array (115) and the diffractive optical element is integrated into the optical source array (105). However, in other embodiments, one or more of the alignment optical source (170), the diffractive optical element (186), and the optical alignment receivers (172, 174, 188, 190) may be located elsewhere on a circuit board that houses either the optical source array (105) or the optical receiver array (115).

Figure 2:
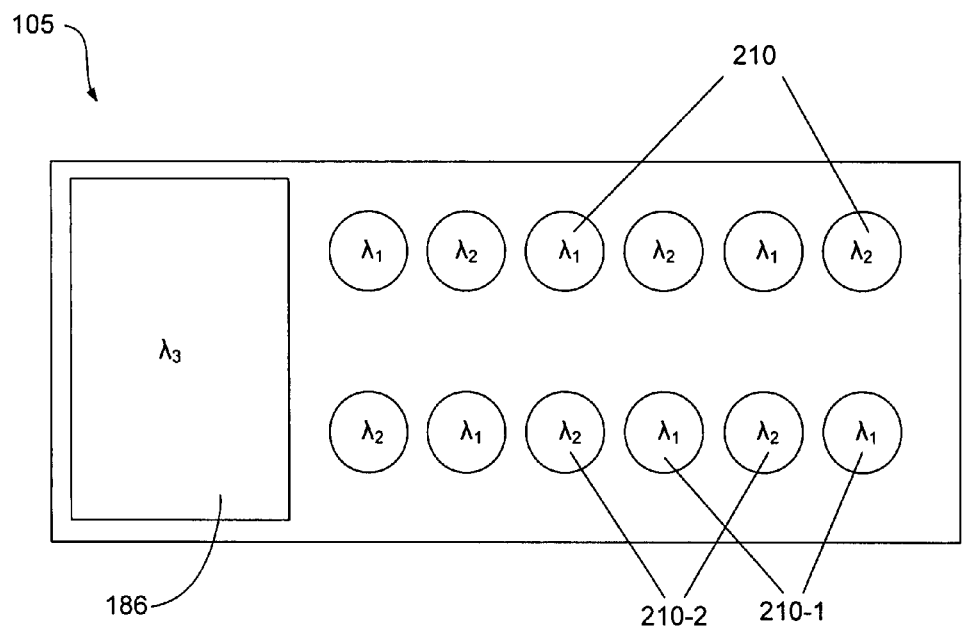
FIG. 2 is an illustration of an exemplary optical source array and diffractive optical element for an optical interconnect, according to principles described herein.

Referring now to FIG. 2, the exemplary optical source array (105) of the optical interconnect (100; FIG. 1) is shown. As described above, the optical source array (105) includes a plurality of optical data sources (210). In the example of FIG. 2, to minimize crosstalk issues between adjacent optical data channels, the optical data sources (210) may operate at a variety of different wavelengths. For example, as shown in FIG. 2, adjacent optical data sources alternate between exemplary wavelengths $\lambda_1$ and $\lambda_2$. Thus, one group of optical data sources (210-1) operate at a first wavelength $\lambda_1$, while a second group of optical data sources (210-2) operate at a second wavelength $\lambda_2$.

The corresponding optical data receivers on the optical receiver array (115; FIG. 1) are accordingly tuned to the respective wavelengths, $\lambda_1$ or $\lambda_2$, of the optical source with which each is to be respectively aligned. The optical data receivers may be tuned using optical filters that attenuate optical energy not at or substantially near the desired wavelength.

Likewise, the diffractive optical element (186), which in the present exemplary optical interconnect (100; FIG. 1) is incorporated into the optical source array (105), may receive optical energy from the alignment optical source (170; FIG. 1) at a third wavelength, $\lambda_3$.

Figure 3:
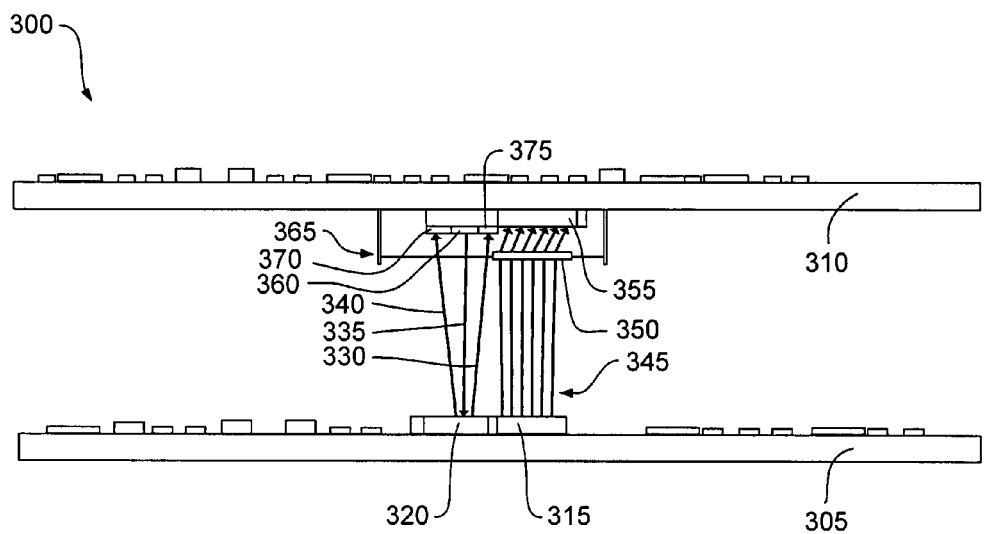
FIG. 3 is an illustration of an exemplary inter-board communication system, according to principles described herein.

Referring now to FIG. 3, an exemplary system (300) for inter-board communication is shown. The exemplary system (300) includes a first circuit board (305) and a second circuit board (310). The first circuit board (305) is configured to transmit data to the second circuit board (310).

The first circuit board (305) includes an optical source array (315) consistent with principles described above in relation to FIGS. 1-2. The optical source array (315) has a plurality of optical data sources that are configured to emit optical beams (345) encoded with data from components on the first circuit board (305). The optical source array (315) may emit adjacent optical beams (345) of different wavelengths, as described previously, to prevent crosstalk among adjacent optical beams.

The second circuit board (310) includes an optical receiver array (355) consistent with principles described above in relation to FIGS. 1-2. The optical receiver array (355) has a plurality of optical data receivers configured to receive the encoded optical beams (345) emitted by the optical source array (315). Furthermore, in embodiments utilizing different wavelengths of optical energy for adjacent optical beams, the optical receivers in the optical receiver array (355) may include optical filters or other means designed to attenuate optical signals not of a specific, designated wavelength.

As shown in FIG. 3, the optical beams (345) emitted by the optical source array (315) may exhibit a certain degree of misalignment with their corresponding optical data receivers in the optical receiver array (355). Such misalignment errors may occur due to misplacement of the circuit boards (305, 310), vibrations, jolts or shocks to the system (300), or various other reasons. For example, vibrations from a cooling fan may cause some misalignment between the arrays (315, 355).

In the illustrated example, a translatable lens (350) is mounted on the second circuit board (310) and is positioned between the optical source array (315) and the optical receiver array (355). The translatable lens (350) may redirect the optical beams (345) from the optical source array (315) in different directions according to the position of the translatable lens (350) with respect to the optical beams (345).

The position of the translatable lens (350) may be selectively altered by an actuator (365). Thus, under states of misalignment, the optical beams (345) from the optical source array (315) may be manipulated toward the optical receiver array (355) by selectively positioning the translatable lens (350) with the actuator (365).

An alignment optical source (360) is disposed on the second circuit board (310) and configured to emit an optical beam (335) toward a diffractive optical element (320) on the first circuit board (305). Diffracted optical beams (330, 340) are reflected back to sensors (370, 375) on the second circuit board (310) from the diffractive optical element (320). By detecting the resulting diffracted optical beams (330, 340) the position of the alignment optical source (360) with respect to the diffractive optical element (320), and by extension, the position of the optical source array (315) with respect to the optical receiver array (355), may be ascertained. As described above with regard to FIG. 1, one or more actuators may adjust the relative positioning of the two boards (305, 310) to align the boards by maximizing the optical signal received by the sensors (370, 375) from the diffractive optical element (320) using a feedback loop.

To further provide optimal communication between the optical source array (315) and the optical receiver array (355), the translatable lens (350) can be positioned to redirect the optical beams (345) from the optical source array (315) to corresponding elements in the optical receiver array (355). For example, an actuator (365) is used to selectively position the translatable lens (350) such that the optical beams (345) from the optical source array (315) are directed through the translatable lens (350) to corresponding optical receivers in the optical receiver array (355). Again, a feedback loop may be used to maximize the intensity of one or more optical beams (345) from the optical source array (315) on a corresponding element or elements in the optical receiver array (355).

Figure 4:
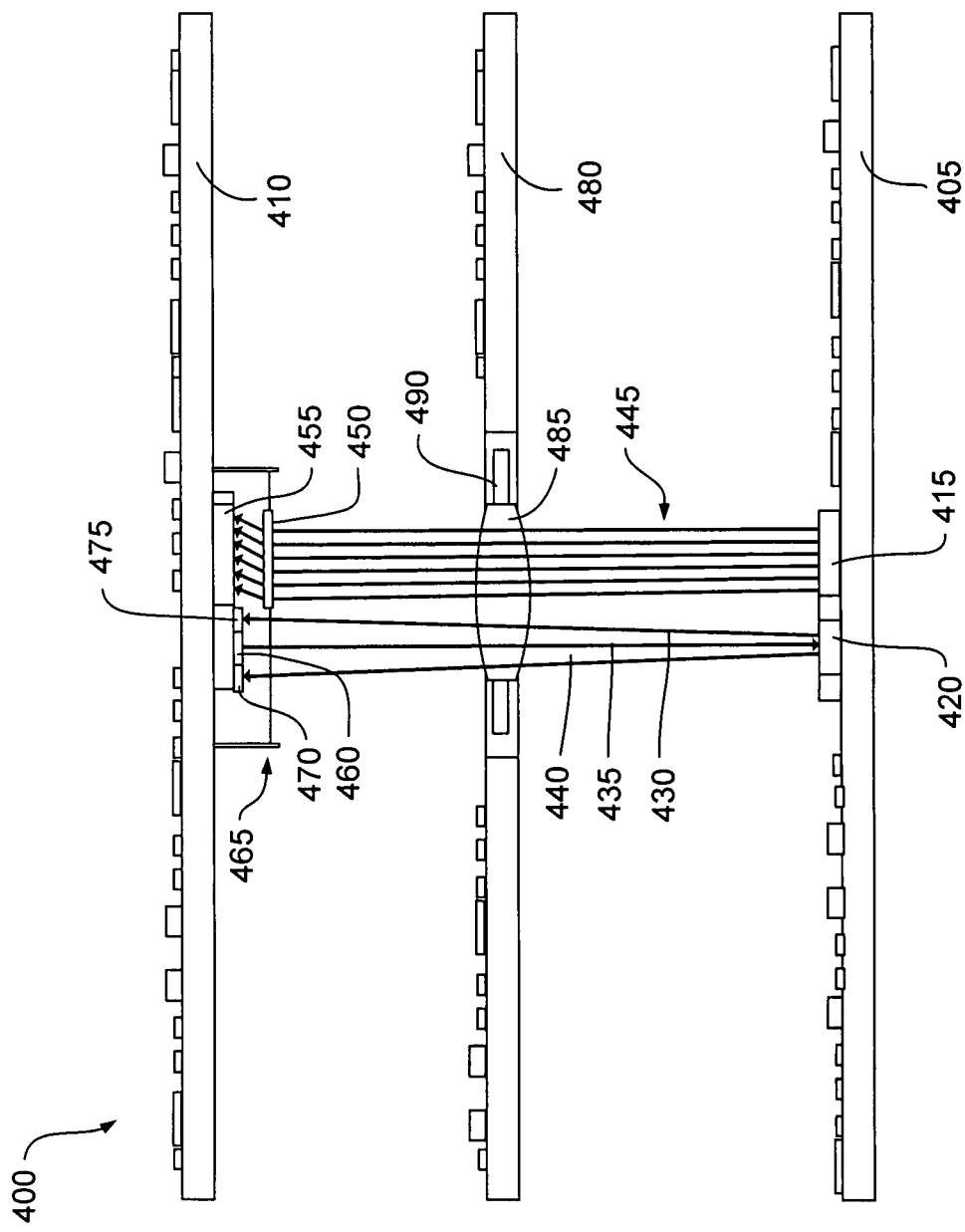
FIG. 4 is an illustration of an exemplary inter-board communication system, according to principles described herein.

Referring now to FIG. 4, another exemplary system (400) for inter-board communication is shown. Like previous embodiments, the exemplary system (400) includes first and second circuit boards (405, 410, respectively). The first circuit board (405) includes an optical source array (415) and a diffractive optical element (420) consistent with the principles of the present specification. The second circuit board (410) includes an optical receiver array (455), an alignment optical source (460), sensors (470, 475), a translatable lens (450), and an actuator (465), consistent with the principles of the present specification.

The exemplary system (400) also includes a third circuit board (480) between the first and second circuit boards (405, 410). As the optical source array (415) of the first circuit board (405) is configured to transmit to the optical receiver array (455) of the second circuit board (410), the third intervening circuit board (480) has a lens (485) configured to focus the optical beams (445) from the optical source array (415) onto the translatable lens (450) of the second circuit board. Additionally, the lens (485) is configured to focus an optical beam (435) from the alignment optical source (460) to the diffractive optical element (420), and diffracted optical beams (430, 440) to feedback sensors (470, 475) on the second circuit board (410).

As the third circuit board (480) may also be prone to vibrations and misalignments with the first and second circuit boards (405, 410), the lens (485) of the third circuit board (480) in the present example includes a stabilizing element (490) configured to maintain the lens (485) in a relatively stable position. The stabilizing element (490) may include one or more of gyroscopes, accelerometers, sensors, and the like in a feedback loop with an actuator to counteract mechanical forces on the lens (485).

Figure 5:
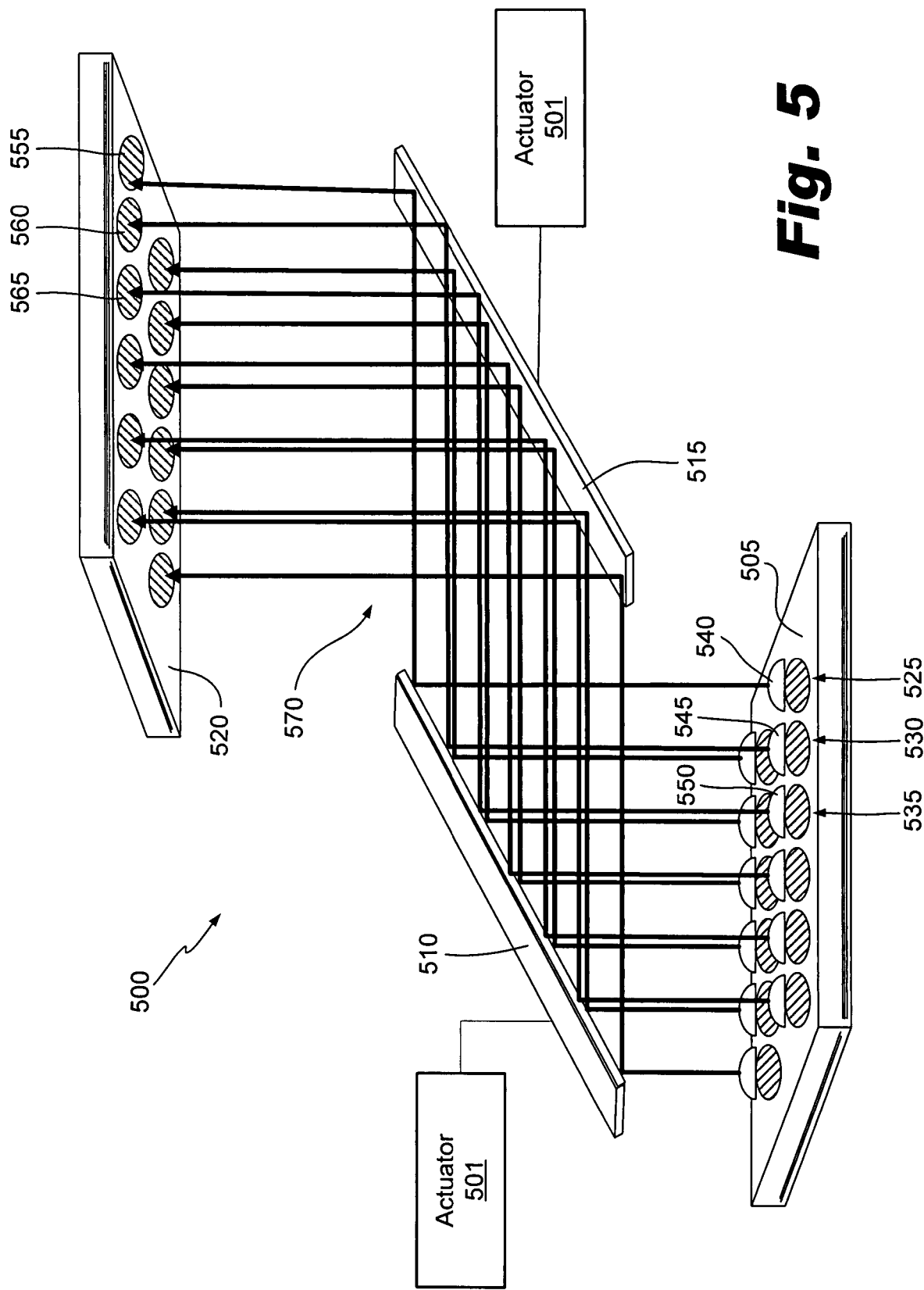
FIG. 5 is an illustration of an exemplary optical interconnect, according to principles described herein.

Referring now to FIG. 5, another exemplary optical interconnect (500) is shown. In this example, the optical interconnect (500) utilizes a pair of translatable mirrors (510, 515) to align optical beams (570) from optical data sources (525, 530, 535) in an optical source array (505) with optical receivers (555, 560, 565) in an optical receiver array (520). The translatable mirrors (510, 515) may be controlled by an actuator (501) to align the optical beams (570) with the optical receivers (555, 560, 565). Static lenses (540, 545, 550) may also be incorporated with the optical data sources (525, 530, 535) and/or optical receivers (555, 560, 565) to additionally focus or recondition the optical beams (570).

As above, a feedback loop may be used to control the actuator (501) to reposition one or both of the mirrors (510, 515). The repositioning may be determined complete, and the desired alignment achieved, when the intensity of one or more optical beams from the source array (505) is maximized at a corresponding optical receiver or receivers of the receiver array (520).

Figure 6:
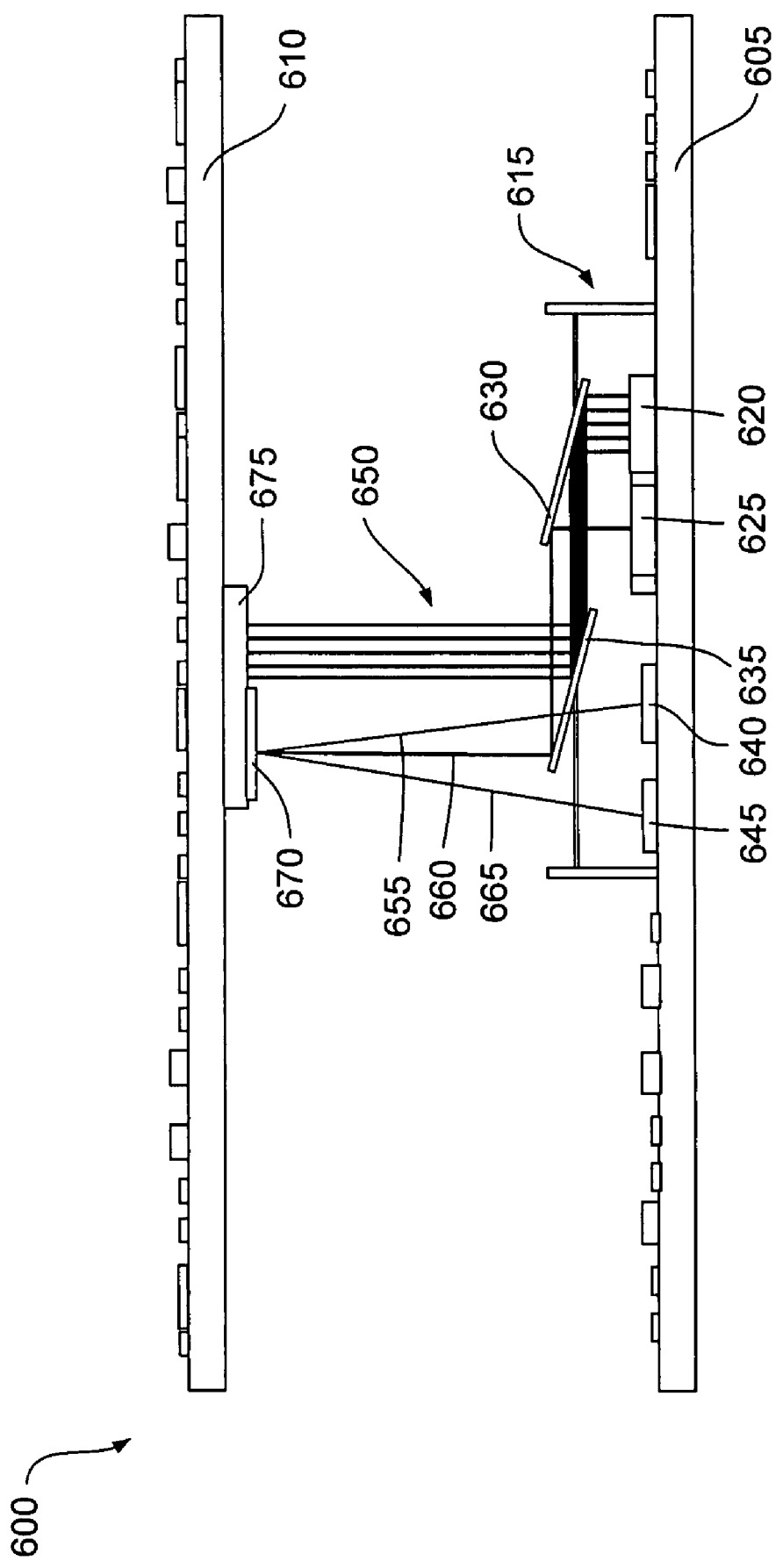
FIG. 6 is an illustration of an exemplary inter-board communication system, according to principles described herein.

Referring now to FIG. 6, an exemplary system (600) for inter-board communication is shown. The system (600) incorporates an optical interconnect having translatable mirrors (630, 635), according to principles described herein. The system (600) includes first and second circuit boards (605, 610). Data from the first circuit board (605) is modulated into optical beams (650) by an optical source array (620). The optical beams (650) are subsequently folded and redirected by the translatable mirrors (630, 635) towards an optical receiver array (675) on the second circuit board (610), where the data-bearing optical beams (650) are received and demodulated and the data is routed to recipient components on the second circuit board (610).

An actuator (615) adjusts the positioning of the translatable mirrors (630, 635) according to the relative positioning of the two circuit boards (605, 610) to manipulate the optical beams (650) toward the optical receiver array (675). The translatable mirrors (630, 635) also direct an optical beam (660) from an alignment optical source (625) to a diffractive optical element (670) on the second circuit board (610). Optical measurements of diffracted optical beams (655, 665) from the diffractive optical element (670) are made at sensors (640, 645) on the first circuit board (605) and vary according to the relative positioning of the circuit boards (605, 610) and the translatable mirrors (630, 635). As in other embodiments, the measurements from the sensors (640, 645) may be used in conjunction with the actuator (615) to achieve a positioning of the translatable mirrors (630, 635) that provides optimal alignment of the optical beams (650) from the optical source array (620) with the optical receivers in the optical receiver array (675).

Exemplary Method

Figure 7:
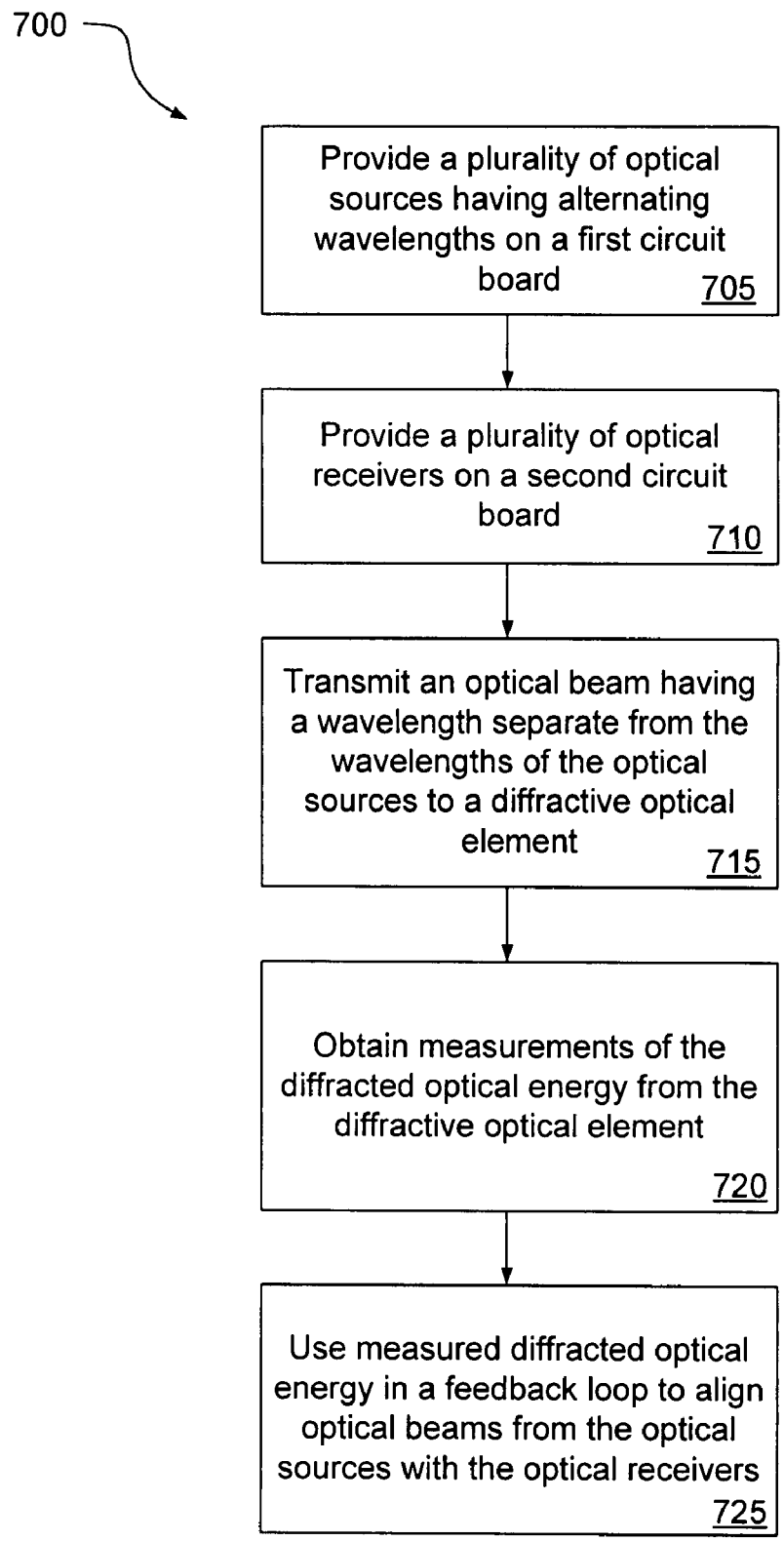
FIG. 7 is a flowchart illustrating an exemplary method of optical communication, according to principles described herein.

Referring now to FIG. 7, a flowchart illustrating an exemplary method (700) of optical communication is shown. The exemplary method (700) includes providing (step 705) a plurality of optical sources on a first circuit board. In some embodiments, adjacent optical sources on the first circuit board have different wavelengths to prevent crosstalk at corresponding receivers.

A plurality of optical receivers are provided (step 710) on a second circuit board. The optical receivers are configured to receive optical beams originating from the optical sources and to decode data encoded on the beams. Adjacent optical receivers may be configured to receive and decode optical beams at different wavelengths. In some embodiments the optical receivers on the second circuit board have optical filters configured to attenuate optical signals not having a target wavelength.

The method (700) further includes transmitting (step 715) an optical beam having a wavelength separate from the wavelengths of the optical sources to a diffractive optical element. Diffracted optical energy from the diffractive optical element is then measured (step 720) at sensors on at least one of the circuit boards. The measured diffracted optical energy is used (step 725) in a feedback loop to align optical beams from the optical sources in the first circuit board with corresponding optical receivers in the second circuit board.

In the feedback loop, the measured diffracted optical energy may be compared to a standard to determine a degree of alignment error. Once the degree of alignment error is ascertained, an actuator may be activated to induce motion in an alignment mechanism, such as a translatable lens or system of translatable mirrors, to achieve an optimal alignment of the optical beams from the optical sources to the corresponding optical receivers. In some embodiments, one or both of the plurality of optical sources and the plurality of optical receivers may be translatable in conjunction with the feedback loop.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. An optical interconnect, comprising:
   a plurality of optical data sources;
   a plurality of optical data receivers;
   a diffractive optical element configured to diffract an optical beam from an alignment optical source to at least one sensor; and
   an aligning element configured to align optical beams from said optical data sources to said optical data receivers according to measurements from said sensor;
   wherein said alignment optical source and said at least one sensor are disposed on a first circuit board and said diffractive optical element is disposed on an opposing surface of a second circuit board;
   wherein said plurality of optical data sources is disposed on one of said first and second circuit boards, and said plurality of optical data receivers is disposed on another of said first and second circuit boards.

2. The optical interconnect of claim 1, wherein adjacent sources in said plurality of optical data sources are configured to emit optical beams having substantially different wavelengths.

3. The optical interconnect of claim 2, wherein receivers in said plurality of optical data receivers comprise optical filters configured to reduce crosstalk from adjacent optical beams.

4. The optical interconnect of claim 1, wherein said alignment optical source is configured to emit an optical beam at a wavelength substantially different from wavelengths emitted by said plurality of optical data sources.

5. The optical interconnect of claim 1, wherein said aligning element comprises an actuator.

6. The optical interconnect of claim 5, wherein said actuator is configured to selectively translate a lens between said plurality of optical data sources and said plurality of optical data receivers.

7. The optical interconnect of claim 5, wherein said actuator is configured to selectively translate first and second selectively translatable mirrors; wherein said first mirror is configured to reflect optical beams from said plurality of optical data sources to said second mirror, and said second mirror is configured to reflect said optical beams to said plurality of optical data receivers.

8. The optical interconnect of claim 1, in which said diffractive optical element is configured to divide said optical beam from said alignment optical source into a plurality of return beams; said sensor comprising a sensor array disposed around said alignment optical source such that at said return beams are incident on sensors within said sensor array and provide a measurement of an angular alignment between said first circuit board and said second circuit board.

9. An inter-board communication system, comprising:
a first circuit board having a plurality of optical data sources;
a second circuit board having a plurality of optical data receivers;
a third circuit board disposed between said first and second circuit boards, said third circuit board having a lens configured to focus optical beams from said plurality of optical data sources to said plurality of optical data receivers;
a diffractive optical element configured to diffract an optical beam from at least one alignment optical source to at least one sensor; and
an aligning element configured to align optical beams from said optical data sources to said optical data receivers according to output from said sensor.

10. The inter-board communication system of claim 9, wherein said third circuit board comprises a device configured to maintain said lens substantially stationary with respect to said first and second circuit boards.

11. The inter-board communication system of claim 9, wherein said device includes a feedback mechanism selected from the group consisting of: accelerometers, gyroscopes, sensors, and combinations thereof.

12. The inter-board communication system of claim 9, wherein adjacent sources in said plurality of optical data sources are configured to emit optical beams having substantially different wavelengths.

13. The inter-board communication system of claim 12, wherein receivers in said plurality of optical data receivers comprise optical filters configured to reduce crosstalk from adjacent optical beams.

14. The optical interconnect of claim 9, wherein said aligning element comprises an actuator.

15. The optical interconnect of claim 14, wherein said actuator is configured to selectively translate a lens between said plurality of optical data sources and said plurality of optical data receivers.

16. The optical interconnect of claim 14, wherein said actuator is configured to selectively translate first and second selectively translatable angled mirrors; wherein said first mirror is configured to reflect optical beams from said plurality of optical data sources to said second mirror, and said second mirror is configured to reflect said optical beams to said plurality of optical data receivers.

17. A method of optical communication, comprising:
providing a plurality of optical sources on a first circuit board;
providing a plurality of optical receivers on a second circuit board;
transmitting an optical beam from an alignment source to a diffractive optical element;
said diffractive optical element dividing said optical beam into a plurality of return beams, each of said return beams having a different angular direction of travel to a detector array;
obtaining measurements of said plurality of return beams diffracted by said diffractive optical element; and
using said measurements in a feedback loop to align optical beams from said optical sources with said optical receivers.

18. The method of claim 17, wherein said optical beams from said optical sources are encoded with data.

19. The method of claim 17, wherein said step of using said measurements in a feedback loop comprises comparing said measurements to a standard to determine a degree of alignment error.

20. The method of claim 17, wherein said step of using said measurements in a feedback loop to align optical beams from said optical sources with said optical receivers comprises activating an actuator.

* * * * *